Nov. 13, 1951     P. A. SIPLE     2,574,502
BELT FASTENER
Filed June 30, 1945
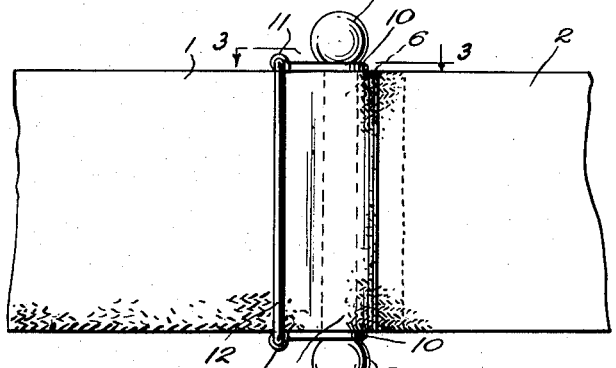
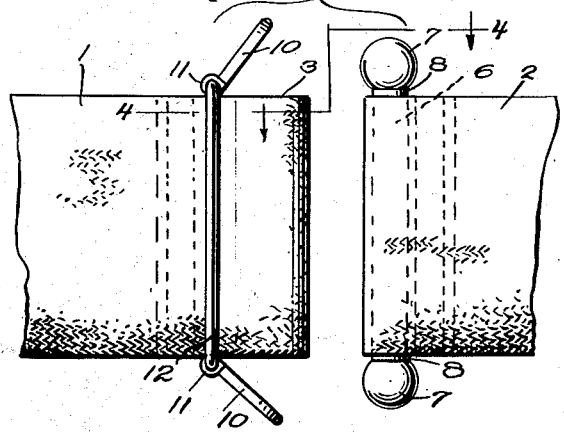
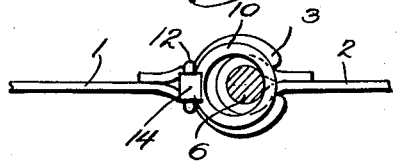
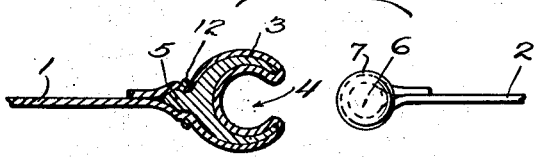
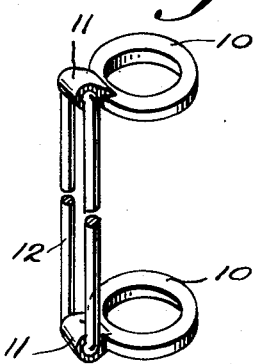
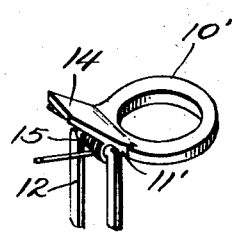
INVENTOR.
Paul A. Siple
BY
William F. Diemond
ATTORNEY Patented Nov. 13, 1951

2,574,502

UNITED STATES PATENT OFFICE 2,574,502

BELT FASTENER

Paul A. Siple, United States Army,
Arlington, Va.

Application June 30, 1945, Serial No. 602,621

8 Claims. (Cl. 24—201)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

This invention relates to belt fasteners, and more particularly to such a device adapted for use on belts, or similar articles, not requiring great mechanical strength, and in which the length of the belt does not require adjustment, or is adjusted by means other than the fastening device.

It is an object of the invention to provide a belt fastening device of simple design, having few parts and capable of being quickly and easily fastened and unfastened, and which will, at the same time, be certain and satisfactory in operation.

A further object is the provision of a fastening of the kind described, capable of fabrication from non-metallic, non-corrodable materials, such as plastics, whereby a structure is provided having adequate mechanical strength for the purpose to which it is adapted and yet possessing the desirable non-corrosive, non-staining and easily workable characteristics of plastic materials.

A still further object of the invention is the provision of a fastening device which can be inexpensively manufactured in large quantities by simple means and utilizing relatively inexpensive and abundant materials.

The above and other objects of the invention are attained by the provision of a fastener in two parts, each of which is attached to one end of a belt, or similar structure. One part of the fastener, termed the receiver element thereof, is of generally C-shape in cross section and is adapted to receive and hold in a clasping manner the other element of the fastener, which is of rod-like form. The rod-like element is generally cylindrical in form and has enlarged end portions serving as a means for securing together the parts of the fastener.

Additional securing means is provided in a modified form of the invention for more securely maintaining the fastener in its fastened condition, while providing for ready unfastening of the same, the additional means comprising ring members secured to the end of the belt back of the receiver element and adapted to engage the rod-like element to hold the same in close confinement within the receiver element.

The invention will be readily understood from the following specification and the accompanying drawings wherein:

Figure 1 is a front elevational view of a belt to which the fastener has been applied, and showing the same in fastened position;

Figure 2 is a front view similar to Figure 1, showing the fastener in unfastened condition;

Figure 3 is a sectional view taken along the line 3—3 of Figure 1 looking in the direction indicated by the arrows;

Figure 4 is a sectional view taken along line 4—4 of Figure 2 looking in the direction indicated by the arrows;

Figure 5 is a perspective view of one form of the additional securing means separated from the fastener, and Figure 6 is a perspective view of a modified form of securing means having operating means therefor.

In the drawings the invention is shown applied to a belt, or like article, having end portions 1 and 2 to which the complementary parts of the fastener are secured. The belt may be of any of the materials of which such articles are customarily made, such, for example, as a flexible webbing or fabric.

The receiver member 3 of the fastening is of generally C-shape in cross section having the slot 4 therein, and may be provided with an attaching flange 5 opposite the slot 4 thereof extending along the entire length of the receiver member. The member 3 is preferably formed of some resilient material capable of rendering its walls sufficiently flexible and strong to receive and hold the complementary member of the fastener. The fabric of the end portion 1 of the belt may be folded around and conformed to the shape of the receiver member 3 as particularly seen in Figure 4, and cemented to the surface thereof and finally cemented or sewed upon itself, thus securely inclosing and holding the receiver in the fabric of the belt. Alternatively the member 3 may be attached to the portion 1 of the belt by sewing the flange 5 along the margin of the fabric by passing a thread back and forth through belt loop 1 and through spaced holes (not shown) in flange 5, or in any other convenient manner.

The slot 4 of the receiver member 3 is of a width smaller than the diameter of the rod 6 together with the inclosing fabric of the end 2 of the belt, but sufficiently wide to accommodate the double thickness of fabric formed by the cementing of the end portion 2 upon itself.

To the end 2 of the belt is secured a rod 6 of metal, plastic, glass, or other suitable material, having enlargements in the form of knobs, beads, or balls 7 formed on its ends. The fabric of the end 2 of the belt is preferably folded around the rod 6 to inclose the same and sewed or otherwise secured upon itself to closely engage the central portion of the rod which is prevented from slipping out of the fabric by the balls 7. The rod 6 is of such a size that when inclosed in the fabric of the end 2 of the belt it will fit tightly into the receiver member 3 when inserted therein and will be firmly held therein by the clasping engagement of the resilient walls of the receiver.

The fastening device may be used in the form thus far described, without additional securing means, in any application wherein the resiliency of the material of the receiver member 3 will provide sufficient strength to hold the parts in fastened condition. When applied as above described the fastener is brought to fastened condition by forcing one of the balls 7 into one end of the member 3 and pressing the same longitudinally therethrough until it emerges from the opposite end thereof, whereupon the C-shaped member 3 will claspingly engage and firmly hold the portion of the rod 6 between the balls 7.

The size of the balls 7 is so proportioned with relation to the thickness of the belt at the end 2 thereof and the width of the slot 4, that upon inserting one of the balls 7 in one end of the receiver member 3, ball 7 will act as a wedge and spread the slot 4 sufficiently to permit the end portion 2 of the belt and rod to slide into the slot.

In separating the fastener either of the balls 7 is pressed into the adjacent end of the member 3 and by grasping the opposite end of the rod 6 the same can be pulled longitudinally out of the receiver member.

Additional securing means, now to be described, are provided where the fastening device is used on an article which is subject to tension or pulling strains such that the resiliency and strength of the receiver member 3 is insufficient to maintain the parts in fastened condition.

As shown in Figures 1 and 2 the rod 6 is made of a length such that short neck portions 8 are formed between the balls 7 and the adjacent edge portions of the belt. These neck portions 8 are for the purpose of accommodating the rings 10 secured to the end portion 1 of the belt behind the member 3 thereon. The rings 10 are provided with pivot portions 11 by which they are secured to the upper and lower ends of an attaching member 12, as will best be seen in Figure 5. The attaching member 12 is preferably formed of wire and extends about the end portion 1 of the belt back of the receiver member 3 of the fastener. The attaching member 12 may engage the fabric of the end portion 1 of the belt where the same overlies the attaching flange 5 of the receiver member 3 and serve as an additional means for securing the fabric to the receiver member, as will best be seen in Figure 4.

In this form of the invention the depth of the opening of the C-shaped receiver member 3 is somewhat greater than the combined width of the rod 6 and the inclosing fabric of the end portion 2, so that the rod 6 can be inserted therein far enough to permit the rings 10 to be passed over the balls 7. The fastener is brought to a fastened condition by inserting one of the balls 7 into one end of the member 3 and pressing the same longitudinally therethrough until it emerges from the opposite end thereof, as previously described, and the rings 10 are passed over the balls 7 whereupon they engage the neck portions 8 of the rod 6 as best seen in Figure 3 of the drawings, and under the tension of the belt are held in engagement therewith. Thus while there is any tension upon the parts of the fastener, the rings 10 will not pass over the balls 7 and the parts are securely maintained in fastened condition.

To separate the fastener it is only necessary to push the rod 6 into the receiver member 3, so that the rings 10 can pass over the balls 7, whereupon the rod 6 can be removed in the manner already pointed out.

In Figure 6 there is illustrated a portion of an additional holding means embodying a modified form of securing ring and spring means for operating the same. The ring 10' has a pivot portion 11' and operating extension 14. A coil spring 15 is provided which holds the ring in contact with the end of the receiver member 3 with the extension 14 projecting upward slightly. It will be understood that two such holding means as are shown in Figure 6 are provided, one at each end of the receiver member 3, in the same manner as shown in Figure 5, and that they are intended for simultaneous operation. In fastening this form of the invention the extensions 14 are depressed between the thumb and forefinger of one hand, lifting the rings 10' away from the ends of the receiver member 3 so that the rod 6 can be inserted therein with the other hand. The extensions 14 are then released and the rings 10' are immediately snapped into position over the balls 7 by the action of the springs 15, and engage the neck portions 8 to hold the parts of the fastener securely in fastened condition.

To separate the fastener it is only necessary to depress the extensions 14 against the action of the springs 15, lifting the rings 10' over the balls 7, and the rod 6 can then be removed from the receiver member 3.

It will be noted that in the cases in which securing rings 10 or 10' are used to hold the fastener in fastened condition, as has been described, the size and depth of the C-shaped receiver member 3, and the thickness of its walls may be such that the rod 6 can be pressed through the slot 4 without passing one of the balls 7 through the receiver member. In this case the walls of the receiver member 3 merely inclose the rod 6, and the fastener is maintained in fastened condition by the operation of the rings 10 or 10' in engagement with the neck portions 8.

It will thus be seen that the invention provides a novel fastening device of simple design and inexpensive construction which can be made as mechanically strong as may be necessary or desirable for the purposes to which it is applied.

Having thus clearly described the invention what is claimed and desired to be secured by Letters Patent is:

1. A belt and fastening means comprising a slotted open-ended hollow member secured to one end of said belt, a rod-like member secured to the other end of said belt and adapted to be received in said hollow member, at least one of said members being resilient, means pivotally secured to said belt adjacent said hollow member for engagement of said rod-like member to secure said rod-like member in said hollow member, and spring means positively urging said pivotally secured means into engagement with said rod-like member.

2. A belt and fastening means comprising a slotted open-ended hollow member secured to one end of said belt, a rod-like member secured to the other end of said belt and adapted to be received in said hollow member, at least one of said members being resilient, enlargements on the ends of said rod-like member for preventing endwise displacement of said rod-like member with respect to said hollow member, and means for securing said rod-like member in said hollow member, said means comprising rings pivoted to said belt adjacent said hollow member and of a size to pass over said enlargements.

3. A belt and fastening means comprising a slotted open-ended hollow member secured to one end of said belt, a rod-like member secured to the other end of said belt and adapted to be received in said hollow member, at least one of said members being resilient, an enlargement on said rod-like member outwardly of an edge of said belt, and means pivotally secured to said belt adjacent said hollow member for securing said rod-like member in said hollow member, said means engaging said rod-like member between said enlargement and said edge of said belt.

4. A belt and fastening means according to claim 3, wherein said last-named means comprise elongated attaching means adapted to be secured to said belt adjacent said hollow member and endless securing means pivoted to an end of said attaching means.

5. A belt and fastening means comprising a slotted open-ended hollow member secured to one end of said belt, a rod-like member secured to the other end of said belt and adapted to be received in said hollow member, at least one of said members being resilient, rings pivotally secured to said belt adjacent said hollow member for securing said rod-like member in said hollow member, said rings engaging said rod-like member outwardly of the edges of said belt, and means for maintaining said rings in positive engagement with said rod-like member.

6. A belt and fastening means comprising a slotted open-ended hollow member secured to one end of said belt, a rod-like member secured to the other end of said belt and adapted to be received in said hollow member, at least one of said members being resilient, rings pivotally secured to said belt adjacent said hollow member for securing said rod-like member in said hollow member, said rings engaging said rod-like member outwardly of the edges of said belt, means for maintaining said rings in positive engagement with said rod-like member, and means for disengaging said rings from said rod-like member.

7. A belt and fastening means comprising a rod secured to one end of said belt, said rod carrying a pair of enlargements, an elongated member secured to the other end of said belt, a pair of rings pivoted to said elongated member, and spring means urging said rings into engagement with said enlargements.

8. A belt and fastening means comprising a hollow slotted receiver member having resilient walls and secured to one end of said belt, a rod-like member secured to the other end of said belt, spherical portions on opposite ends of said rod-like member extending beyond the ends of said receiver member, each of said spherical portions being of sufficient thickness to wedge said receiver member apart for the passage therethrough of said rod-like member and belt end secured thereto, and rings pivotally secured to said belt adjacent that end of said belt which is secured to said receiver member, said rings engaging said rod-like member between said spherical enlargements and the edges of said belt

PAUL A. SIPLE.

REFERENCES CITED

The following references are of record in the file of this patent:

UNITED STATES PATENTS

| Number | Name | Date |
|---|---|---|
| 166,059 | Atha | July 27, 1875 |
| 288,749 | Way | Nov. 20, 1883 |
| 561,866 | Coles | June 9, 1896 |
| 636,148 | Kenyon | Oct. 31, 1899 |
| 643,639 | Faxon | Feb. 20, 1900 |
| 737,062 | Bennett | Aug. 25, 1903 |
| 796,414 | Chayes | Aug. 8, 1905 |
| 835,752 | Gingras | Nov. 13, 1906 |
| 879,282 | Mandeville | Feb. 18, 1908 |
| 926,614 | Smith | June 29, 1909 |
| 987,687 | Banta | Mar. 28, 1911 |
| 1,015,166 | Fraizer | Jan. 16, 1912 |
| 1,044,686 | Osmers | Nov. 19, 1912 |
| 1,262,053 | Jeaffreson | Apr. 9, 1918 |
| 1,634,622 | Menges | July 5, 1927 |
| 1,995,517 | Neugass | Mar. 26, 1935 |
| 2,178,302 | Haase | Oct. 31, 1939 |

FOREIGN PATENTS

| Number | Country | Date |
|---|---|---|
| 254 | Great Britain | of 1902 |
| 8,670 | Great Britain | of 1898 |
| 86,272 | Germany | Apr. 7, 1896 |
| 545,911 | France | Aug. 4, 1922 |